E. G. PARVIN.
COMMUTATING DYNAMO ELECTRIC MACHINE.
APPLICATION FILED APR. 9, 1920.

1,369,297.   Patented Feb. 22, 1921.

Inventor
Edward G. Parvin
By his Attorney
John E. Hubbell

UNITED STATES PATENT OFFICE.

EDWARD G. PARVIN, OF ROSELLE, NEW JERSEY, ASSIGNOR TO ZOBELL ELECTRIC MOTOR CORPORATION, OF GARWOOD, NEW JERSEY, A CORPORATION OF NEW YORK.

COMMUTATING DYNAMO-ELECTRIC MACHINE.

1,369,297.  Specification of Letters Patent.  Patented Feb. 22, 1921.

Application filed April 9, 1920. Serial No. 372,554.

*To all whom it may concern:*

Be it known that I, EDWARD G. PARVIN, a citizen of the United States, and resident of Roselle, in the county of Union and State of New Jersey, have invented certain new and useful Improvements in Commutating Dynamo-Electric Machines, of which the following is a specification.

My present invention relates to commutating dynamo electric machines having interpoles to prevent sparking, and the object of my invention is to provide a simple and effective interpole arrangement for a dynamo electric machine having a drum wound armature with short chord windings, *i. e.*, windings in which the opposite sides of each armature coil are spaced apart on the circumference of the armature by an angle less than the angle between adjacent main exciting poles of the machine.

The various features of novelty which characterize my invention are pointed out with particularity in the claim annexed to and forming a part of this specification. For a better understanding of the invention, however, and the advantages possessed by it reference should be had to the accompanying drawings and descriptive matter in which I have illustrated and described preferred embodiments of my invention.

Figure 3:
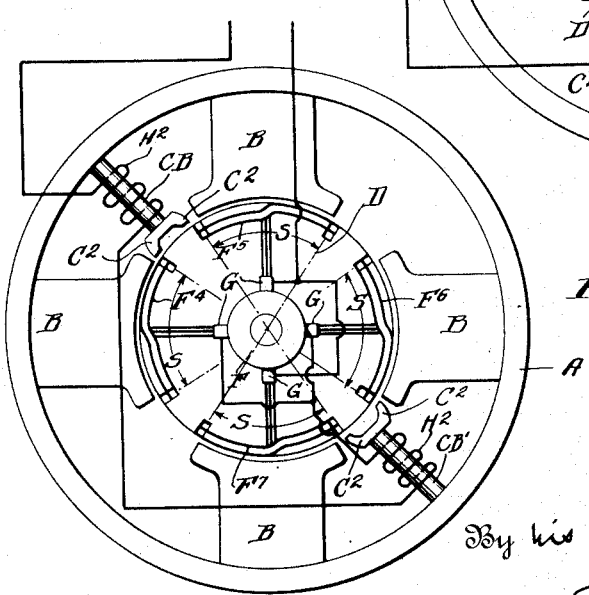

And Fig. 3 is a diagrammatic end view of a multipolar machine.

Figure 1:
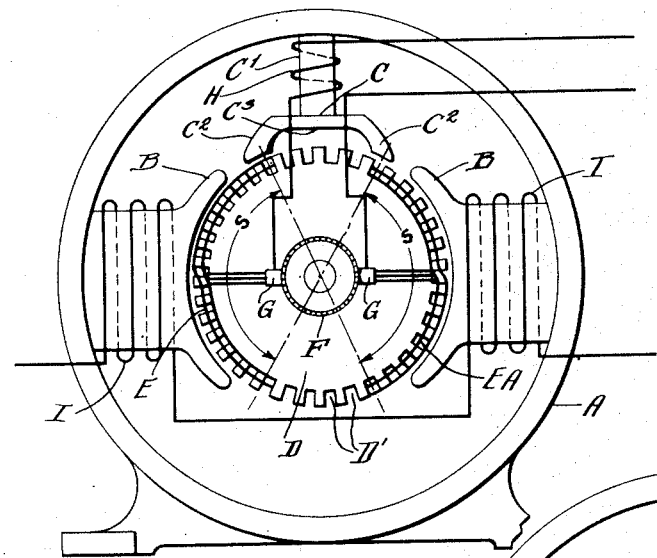
Figure 1 is a somewhat diagrammatic end view of a bipolar machine.

In the drawings, and referring first to the construction shown in Fig. 1, A represents the field ring of a bipolar dynamo electric machine which may be either a motor or a generator, and is, except for the special interpole arrangement, of conventional type. The field ring is provided with two diametrically opposed main exciting poles B, and with an interpole C. The armature D is shown as slotted at D' to receive the armature windings, of which only the two coils E and EA, undergoing commutation are shown. F represents the commutator of the machine, and G the collecting brushes. The two sides of each armature coil are separated by an angle S, measured about the armature shaft, which is substantially less than the 180° angle between the axes of the two main exciting poles B. In consequence the coils E and EA do not come together but have their adjacent sides separated by an angle of some magnitude. The core of the interpole C comprises a spool portion C' surrounded by the energizing winding H, and a polar portion which is shaped to provide two separate pole faces $C^2$, one of which covers one side of the coil E, and the other of which covers the adjacent side of the coil EA when these two coils are undergoing commutation. It will be understood, of course, that as the armature is rotated each of the various armature coils passes through the positions occupied in Fig. 1 by the two coils E and EA, once during each rotation of the armature. The exciting winding H for the interpole C is connected in series with the armature. The exciting windings I for the main poles B may be connected in shunt to the armature or may be energized in any other suitable manner.

Those skilled in the art will readily see that the special construction shown in Fig. 1 possesses certain important practical advantages. The use of the short chord armature windings shortens the coils and thereby reduces the amount of copper required in a machine of given output, while the proper commutating field to prevent sparking is impressed on each armature coil by a single interpole structure with a minimum weight of copper and magnetic material for this purpose.

Figure 2:
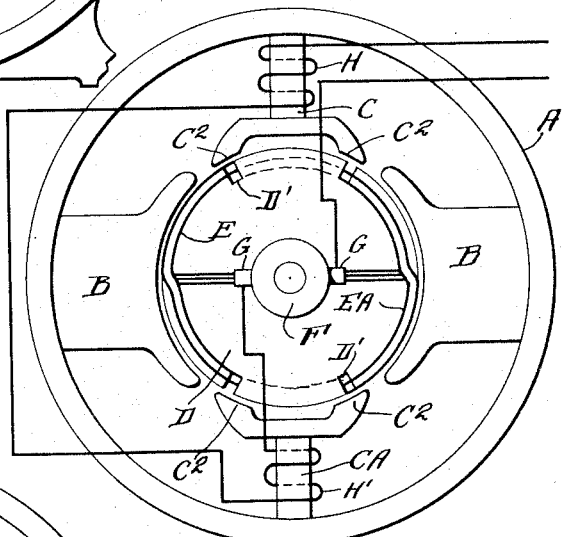
Fig. 2 is a view taken similarly to Fig. 1 illustrating a modification.

It will be obvious, to these skilled in the art that where, for any reason, it is desired to subject each side of each coil undergoing commutation to the action of a suitable commutating field, my special interpole construction may be employed to do this. For example with such a bipolar machine as is shown in Fig. 1, it is only necessary to add a second interpole CA similar to the pole C as shown in Fig. 2. The pole CA is diametrically opposed to the pole C, and its winding H' is connected in series with the winding H of the pole C.

In Fig. 3 I have illustrated the use of my invention in a multipolar machine. As shown in Fig. 3, the opposite sides of each of the four coils $F^4$, $F^5$, $F^6$ and $F^7$, simultaneously undergoing commutation, are separated from one another by an angle substantially less than the angle of 90° between each adjacent pair of main exciting poles B. As shown in Fig. 3 there are two diametrically opposed commutating poles CB and CB', each of which may be identical with the interpole C of the construction first described. One pole face portion $C^2$ of the pole CB acts on one side of the coil $F^4$ while the other pole face portion $C^2$ acts on the adjacent side of the coil $F^5$. The two pole face portions $C^2$ of the interpole CB' act simultaneously upon the adjacent sides of the coils $F^6$ and $F^7$. As shown in Fig. 3 the diametrically opposed brushes are connected together, and the windings $H^2$ for the two interpoles are connected in series with the armature.

While in accordance with the provisions of the statutes, I have illustrated and described the best forms of my invention now known to me, it will be apparent to those skilled in the art that changes may be made in the form of the apparatus disclosed without departing from the spirit of my invention, as set forth in the appended claim.

Having now described my invention, what I claim as new and desire to secure by Letters Patent, is:

The combination in a dynamo electric machine, of an armature having a short chord drum winding, a commutator, collecting brushes, a field magnet having a pair of main exciting poles of opposite polarity, and an interpole structure between said main poles, and consisting of a core comprising a spool portion and a polar portion, the latter being shaped to provide two pole faces spaced apart circumferentially of the armature to act simultaneously on coils of said drum winding connected to brushes of opposite polarity, and an exciting winding surrounding said spool and in series with said armature.

Signed at New York in the county of New York and State of New York this 30th day of March A. D. 1920.

EDWARD G. PARVIN.